US007007787B2

(12) United States Patent
Pallini et al.

(10) Patent No.: US 7,007,787 B2
(45) Date of Patent: Mar. 7, 2006

(54) HIGH ENDURANCE HIGH CAPACITY BALL TRANSFER UNIT

(75) Inventors: Robert A. Pallini, Cheltenham, PA (US); Kevin Sullivan, Perkasie, PA (US); Werner B. Guilford, Hulmeville, PA (US)

(73) Assignee: Roller Bearing Company of America, Oxford, CT (US)

( * ) Notice: Subject to any disclaimer, the term of this patent is extended or adjusted under 35 U.S.C. 154(b) by 0 days.

(21) Appl. No.: 10/897,515

(22) Filed: Jul. 23, 2004

(65) Prior Publication Data

US 2006/0016664 A1    Jan. 26, 2006

(51) Int. Cl.
B65G 13/00    (2006.01)
(52) U.S. Cl. .............................................. 193/35 MD
(58) Field of Classification Search ........... 193/35 MD
See application file for complete search history.

(56) References Cited

U.S. PATENT DOCUMENTS

| | | | |
|---|---|---|---|
| 1,963,956 A | 6/1934 | Craig | |
| 3,466,697 A | 9/1969 | Cain et al. | |
| 3,739,894 A | 6/1973 | Hinman | |
| 4,553,795 A | 11/1985 | Takagi | |
| 4,660,994 A | 4/1987 | Masciarelli | |
| 4,696,583 A | 9/1987 | Gorges | |
| 4,732,490 A | 3/1988 | Masciarelli | |
| 4,778,041 A | 10/1988 | Blaurock | |
| 4,871,052 A * | 10/1989 | Huber | 193/35 MD |
| 5,033,601 A * | 7/1991 | Huber | 193/35 MD |
| 5,096,308 A * | 3/1992 | Sundseth | 384/49 |
| 5,219,057 A * | 6/1993 | Sundseth | 193/35 MD |
| 5,358,337 A | 10/1994 | Codatto | |
| 5,375,679 A * | 12/1994 | Biehl | 182/181.1 |
| 5,464,086 A * | 11/1995 | Coelln | 193/35 SS |
| 5,516,211 A * | 5/1996 | Barnes et al. | 384/49 |
| 5,533,604 A * | 7/1996 | Brierton | 193/35 MD |
| 5,538,346 A | 7/1996 | Frias et al. | |
| 5,540,314 A * | 7/1996 | Coelln | 193/35 MD |
| 5,673,780 A * | 10/1997 | Bildsoe | 193/35 MD |
| 6,120,185 A | 9/2000 | Masciarelli, Jr. | |
| 6,129,195 A * | 10/2000 | Matheny | 193/35 MD |
| 6,279,716 B1 * | 8/2001 | Kayatani et al. | 193/35 MD |
| 6,457,865 B1 | 10/2002 | Masciarelli, Jr. | |
| 6,516,934 B1 | 2/2003 | Masciarelli, Jr. | |

* cited by examiner

*Primary Examiner*—Richard Ridley
(74) *Attorney, Agent, or Firm*—Michaud-Duffy Group LLP

(57) ABSTRACT

An extended life ball transfer unit has a housing with a well of generally cup-shaped configuration with at least the lower portion of its surface being defined by a pair of radii mutually offset to opposite sides from its vertical axis to generate a gothic church arch cross section. A passage extends therethrough at the base of the housing well. Sealed in the well is a spherical conveyor ball having a radius of smaller length than the radii defining the lower surface of the well, and the well defining radii having their origins above the center of the conveyor ball. A multiplicity of spherical bearing balls is disposed between the conveyor ball and at least the lower portion of the well. The bearing balls support the conveyor ball and transferring the load from the conveyor ball to the housing over an annular area defined by an arc of about 5-15° with its center spaced about 30°–40° upwardly from the passage. A annular cap is seated in the upper portion of the well and has an inner surface portion bearing against the surface of the conveyor ball to provide a sealing action limiting debris from passing into the lower portion of the well.

12 Claims, 3 Drawing Sheets

HIGH ENDURANCE HIGH CAPACITY BALL TRANSFER UNIT

BACKGROUND OF THE INVENTION

The present invention relates to ball transfer units utilized to provide a conveying surface on which articles may be readily moved.

Ball transfer units are widely employed in connection with conveyors for movement of various articles such as cargo from an aircraft. The ball transfer units are assembled in a housing or support to provide a surface containing many spherical balls upon which the articles are readily moved. Illustrative of such ball transfer units are Coelln U.S. Pat. No. 5,540,314, Barnes et al U.S. Pat. No. 5,516,211 and Huber U.S. Pat. No. 5,033,601.

Generally, such ball transfer units comprise a housing providing a well in which a large conveyor ball is seated and the conveyor ball rides upon small ball bearings which in turn roll upon the surface of the well. Many units include caps to provide some sealing action at the upper portion of the well so as to limit debris from falling into the well and interfering with the operation of the transfer unit. To avoid accumulation of debris and water within the well, it is customary to provide a through passage at the bottom of well.

Conventionally, the centers of the conveyor ball and of the arc which defines the arcuate surface of the well are coincident so that the spacing between the conveyor ball and the surface of the well is uniform at least over the lower portion thereof. As a result, most of the load on the conveyor ball is transferred to the housing adjacent the bottom of the well, and this is generally the weakest section for the housing.

It is an object of the present invention to provide a novel ball transfer unit in which the load is transferred from the conveyor ball to the housing in an area where the housing is of greater strength than at its base.

It is also an object to provide such a ball transfer unit which may be fabricated readily and which provides enhanced durability.

Another object is to provide such a ball transfer unit which is relatively economical to fabricate and to assemble.

SUMMARY OF THE INVENTION

It has now been found that the foregoing and related objects may be readily attained in an extended life ball transfer unit including a housing having a well of generally cup-shaped configuration with at least the lower portion of its surface being defined by a pair of radii mutually offset to opposite sides from its vertical axis to generate a gothic church arch cross section. The housing has a passage extending therethrough at the base of the well. Disposed in the well is a spherical conveyor ball having a radius of smaller length than the radii defining the lower portion of the surface of the well, and the well defining radii have origins above the center of the conveyor ball. A multiplicity of spherical bearing balls is disposed between the conveyor all and at least the lower portion of the surface of the well. The bearing balls support the conveyor ball and transfer the load from the conveyor ball to the housing over an annular area defined by an arc of 5–15° with its center spaced about 30°–40° upwardly from the passage.

The housing is of generally circular cross section, and is fabricated from hardened steel. Desirably, at least the surface of the well has a corrosion resistant metal deposit thereon. Generally, an annular cap seats in the upper portion of the well, and it has an inner surface portion bearing against the surface of the conveyor ball to provide sealing action limiting debris from passing into the lower portion of the well. The cap has an arcuate inner surface inclined upwardly towards the conveyor ball to provide the sealing action adjacent its upper end.

The cap is fabricated from a synthetic resin, the surface of the well has an annular groove extending thereabout adjacent its upper end in which is seated an annular rib extending about the outer surface of the cap.

DETAILED DESCRIPTION OF THE PREFERRED EMBODIMENT

Figure 1:
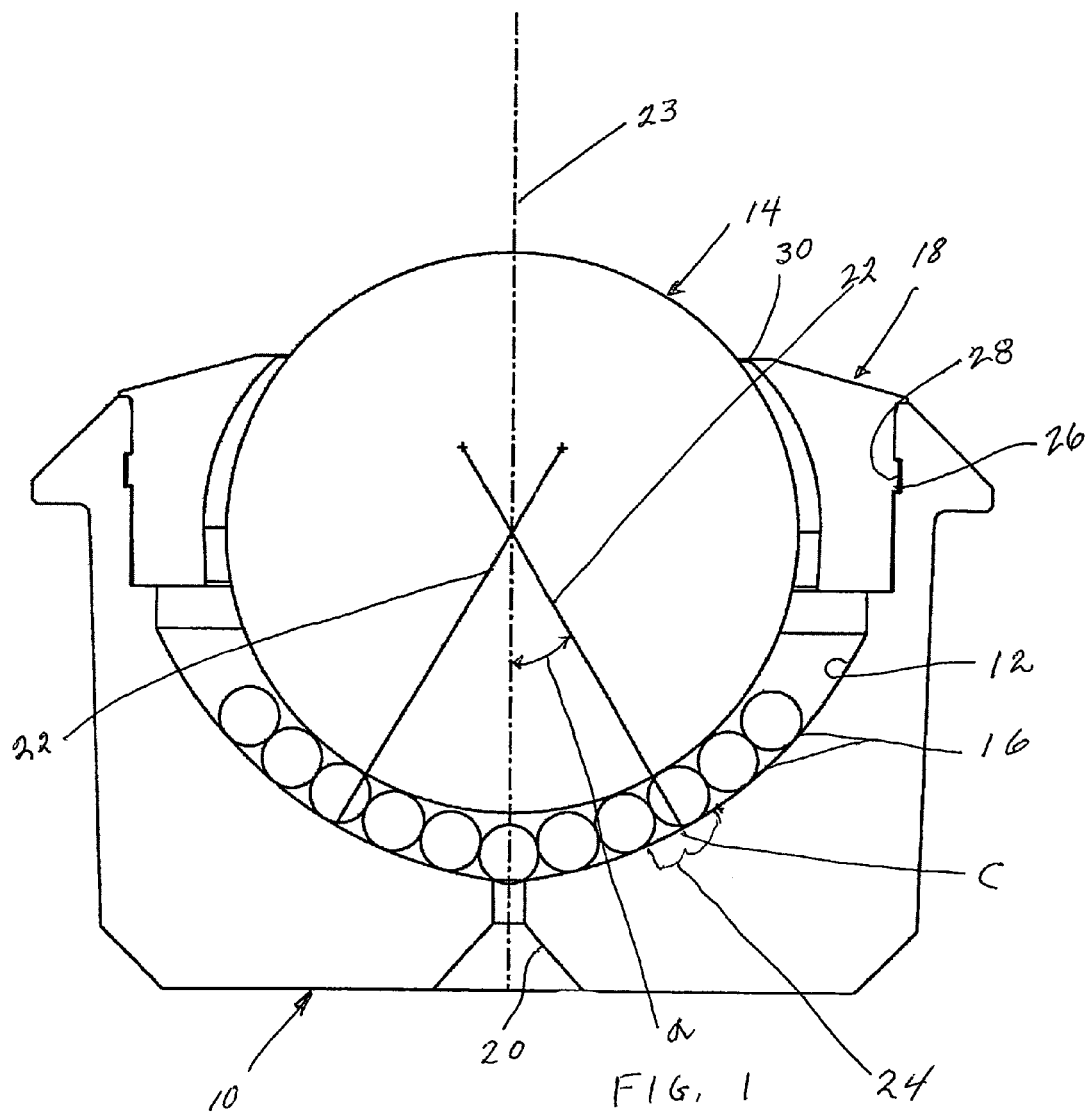
FIG. 1 is a cross sectional view of a ball transfer unit embodying the present invention.
Figure 2:
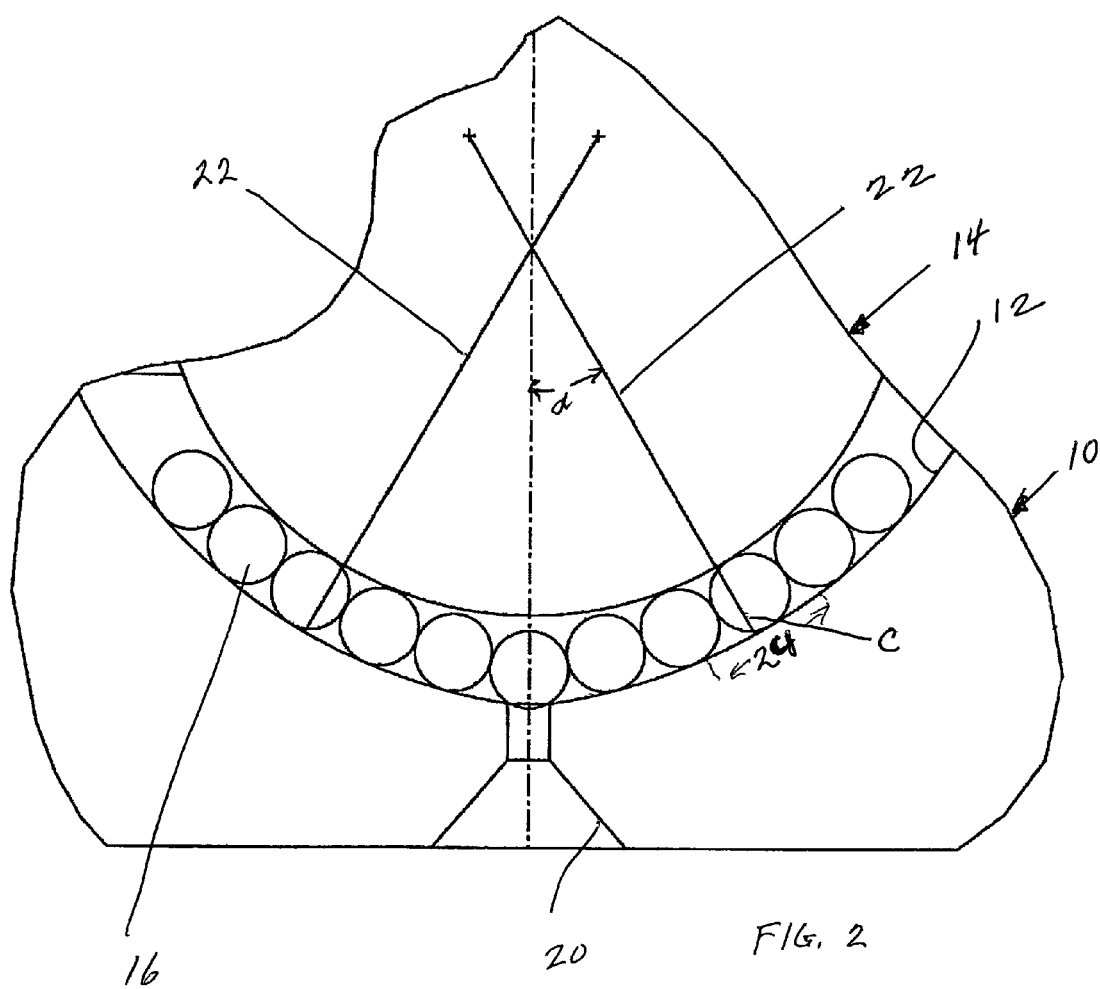
FIG. 2 is a fragmentary enlarged section of the ball transfer unit of FIG. 1.

A ball transfer unit embodying the present invention has a housing generally designated by the numeral 10 with a cup-shaped well 12, a conveyor ball generally designated by the numeral 14, and a multiplicity of bearing balls 16 therebetween. A cap generally designated by the numeral 18 is seated in the upper portion of the well 12.

The outer surface of the housing 10 is of generally circular configuration and the well 12 and outer surface generate a generally annular cross section. The surface of the well 12 is provided with a corrosion-resistant electrodeposit such as zinc/nickel. At the lowest point of the well 12 there is a through passage 20 to discharge debris and water which may penetrate the seal provided by the cap 18.

The lower portion of the well 12 is not spheroidal but is generated by a pair of equal length radii 22 which are mutually offset from the vertical axis 23 and intersect at point A which is above the center B of the conveyor ball 14. The resultant configuration is in the form of a gothic church arch and the spacing of the conveyor ball 14 from the surface of the wall varies. As a result, the spacing between the opposed surfaces of the conveyor ball 14 and the portion 24 of the wall 12 is smallest over an arc of 5–15° having its center C spaced 30° to 40° upwardly from the passage 20.

The bearing balls 16 are of uniform diameter and are provided in a volume which extends above the portion 24 and preferably to at least 90° from the passage 20. As is conventional, the bearing balls 16 are fabricated from hardened steel, and have a uniform diameter which is substantially equal to the spacing between the conveyor ball 14 and the surface of the well 12 at the center of portion 24.

The cap 18 is fabricated of synthetic resin and is of generally annular cross section. It has a circumferential rib 26 which extends about its vertical outer surface, and the housing 10 has a channel 28 in the well 12 which seats the rib 26. The inner surface of the cap 18 is arcuate and slopes inwardly and upwardly to a lip 30 which wipes the surface of the conveyor ball 14 to provide sealing action for the well 12.

As can be seen in the accompanying drawings, the radii 22 define arcuate surfaces for the well which are most closely spaced to the conveyor ball and angled to 30–40° from the passage 20. As a result, the bearing balls 16 in the area designated C bear the load on the conveyor ball and transfer that load to the surface of the housing 10 which is relative thick and able to withstand the heavy load being transferred thereto. The bearing balls 16 adjacent the bottom of the well are spaced slightly from the conveyor ball and can roll freely without bearing any of the load from the conveyor ball. The free rotation of the balls on the lower portion avoids build up of debris and water which can easily pass outwardly through the passage 20.

Figure 3:
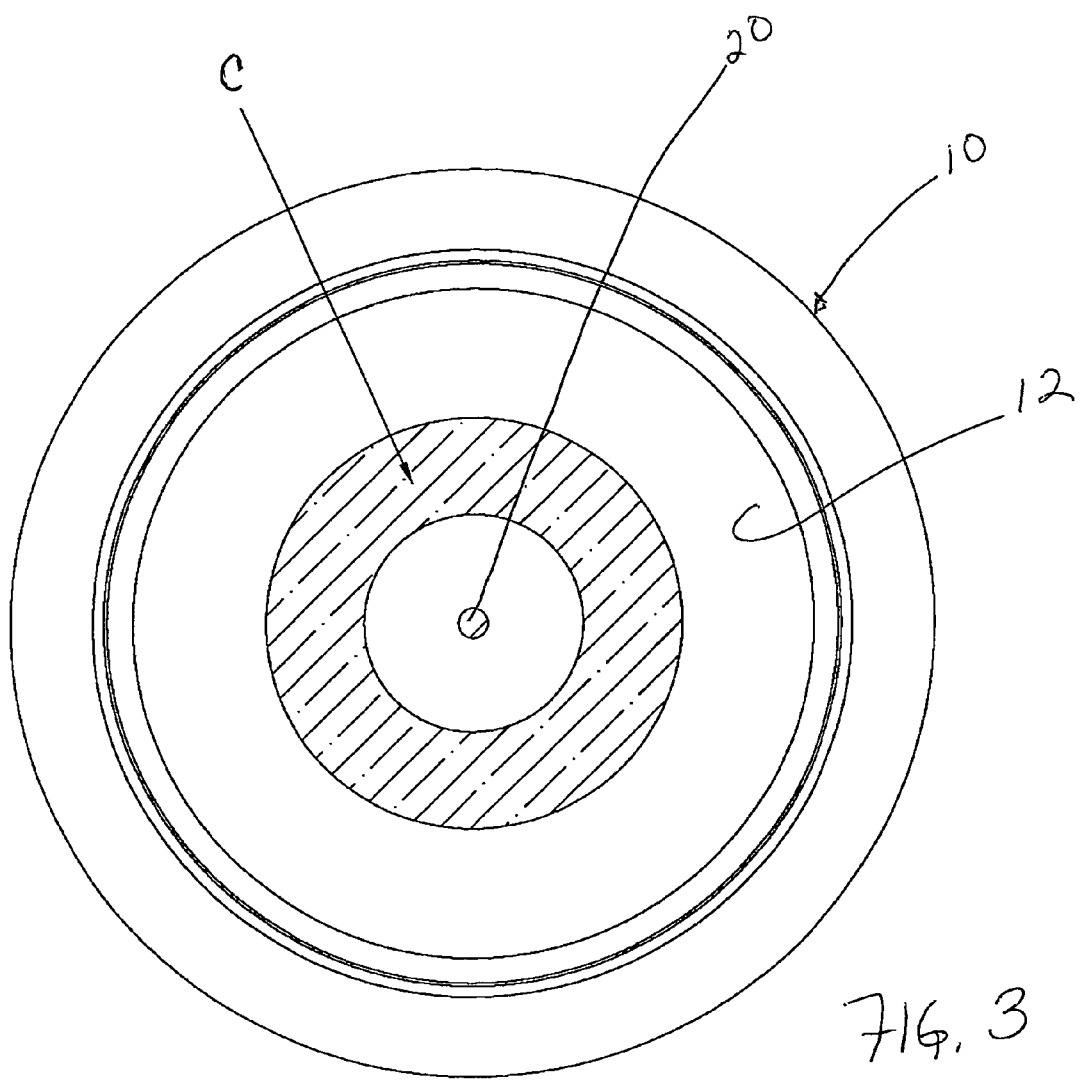
FIG. 3 is a plan view of the housing indicating the surface portion of the well comprising the load transfer area.

Turning to FIG. 3, the arcuate sector of the well in which there is transfer of the load designated by the letter C.

In assembling the unit, the bearing balls 16 are inserted into the well 12 and then the conveyor ball 14 is placed thereon and rotated to spread the bearing balls 16 between the opposed surfaces. Thereafter, the cap 18 is inserted into the upper end of the well 12 and pushed downwardly until the rib 26 thereon snaps into the groove or channel 28 in the surface of the well 12 thus retaining the conveyor ball 14 in its operative position.

Typically, the conveyor ball and the bearing balls are fabricated from hardened stainless steel to provide optimum wear and corrosion resistance, and the housing 10 is electroplated with a corrosion resistant coating such as zinc/nickel alloy.

Various resins may be employed for the cap, but the resin selected should provide good wear resistance, impact resistance and lubricity. It should also be free of any tendency to absorb moisture. Suitable resins comprise acetal, polytetrafloroethylene and polypropylene.

Thus, it can be seen from the foregoing detailed specification and attached drawings that the ball transfer unit of the present invention effectively transfers the load from the conveyor ball to a relatively strong portion of the housing to provide a more long lived structure. Moreover, the free movement of the ball bearings adjacent the discharge aperture minimize the tendency of a build up of debris and/or moisture at the bottom of the well which would increase corrosion and wear. The components can be readily fabricated and are easily assembled to provide an economical and long lived structure.

What is claimed is:

1. An extended life ball transfer unit comprising:
    (a) a housing having a well of generally cup-shaped configuration with at least the lower portion of its surface being non-spheroidal and defined by a pair of radii mutually offset to opposite sides from its vertical axis to generate a gothic church arch cross section, said housing having a passage extending therethrough at the base of said well;
    (b) a spherical conveyor ball having a radius of smaller length than the radii defining the lower portion of the surface of said well, said well defining radii having their origins above the center of said conveyor ball; and
    (c) a multiplicity of spherical bearing balls disposed between said conveyor ball and at least the lower portion of the surface of said well, said bearing balls supporting said conveyor ball and transferring the load from said conveyer ball to said housing over an annular area defined by an arc of 5–15° with its center spaced about 30°–40° upwardly from said passage.

2. The ball transfer unit in accordance with claim 1 wherein said housing is of generally circular cross section.

3. The ball transfer unit in accordance with claim 1 wherein said housing is fabricated from hardened steel.

4. The ball transfer unit in accordance with claim 3 wherein at least the surface of said well has a corrosion resistant metal deposit thereon.

5. The ball transfer unit in accordance with claim 1 wherein there is included an annular cap seated in the upper portion of said well and having an inner surface portion bearing against the surface of said conveyor ball to provide a sealing action limiting debris from passing into the lower portion of said well.

6. The ball transfer unit in accordance with claim 5 wherein said cap has an arcuate inner surface inclined upwardly towards said conveyor ball to provide the sealing action adjacent its upper end.

7. The ball transfer unit in accordance with claim 5 wherein said cap is fabricated from a synthetic resin.

8. The ball transfer unit in accordance with claim 5 wherein the surface of said well has an annular groove extending thereabout adjacent its upper end and said cap has an annular rib extending about its outer surface seated in said groove.

9. An extended life ball transfer unit comprising:
    (a) a housing having a well of generally cup-shaped configuration with at least the lower portion of its surface being defined by a pair of radii mutually offset to opposite sides from its vertical axis to generate a gothic church arch cross section, said housing having a passage extending therethrough at the base of said well;
    (b) a spherical conveyor ball having a radius of smaller length than the radii defining the lower portion of the surface of said well, said well defining radii having their origins above the center of said conveyor ball;
    (c) a multiplicity of spherical bearing balls disposed between said conveyor ball and at least the lower portion of the surface of said well, said bearing balls supporting said conveyor ball and transferring the load from said conveyer ball to said housing over an annular area defined by an arc of 5–15° with its center spaced about 30°–40° upwardly from said passage; and
    (d) an annular cap seated in the upper portion of said well and having an inner surface portion bearing against the surface of said conveyor ball to provide a sealing action limiting debris from passing into the lower portion of said well, the surface of said well having an annular groove extending thereabout adjacent its upper end and said cap having an annular rib extending about its outer surface seated in said groove.

10. The ball transfer unit in accordance with claim 9 wherein said housing is of generally circular cross section fabricated from hardened steel, and has a corrosion resistant metal deposit on at least the surface of said well.

11. The ball transfer unit in accordance with claim 9 wherein said cap has an arcuate inner surface inclined upwardly towards said conveyor ball to provide the sealing action adjacent its upper end, said cap being fabricated from a synthetic resin.

12. An extended life ball transfer unit comprising:
    (a) a housing having a well of non-uniform wall thickness and generally cup-shaped configuration with at least the lower portion of its surface being defined by a pair of radii mutually offset to opposite sides from its vertical axis to generate a gothic church arch cross section, said housing having a passage extending therethrough at the base of said well;
    (b) a spherical conveyor ball having a radius of smaller length than the radii defining the lower portion of the surface of said well, said well defining radii having their origins above the center of said conveyor ball; and
    (c) a multiplicity of spherical bearing balls disposed between said conveyor ball and at least the lower portion of the surface of said well, said bearing balls supporting said conveyor ball and transferring the load from said conveyer ball to said non-uniform wall thickness housing over an annular area of the housing having greater thickness than the area adjacent said passage, said annular area defined by an arc of 5–15° with its center spaced about 30°–40° upwardly from said passage.

* * * * *